United States Patent
Guo et al.

(10) Patent No.: US 11,376,670 B2
(45) Date of Patent: Jul. 5, 2022

(54) CUTTING METHOD FOR ALUMINUM ALLOY CASTING, AND TRIMMING DIE

(71) Applicant: CITIC Dicastal CO., LTD., Hebei (CN)

(72) Inventors: Haijun Guo, Qinhuangdao (CN); Dengyao Li, Qinhuangdao (CN); Gang Zhao, Qinhuangdao (CN); Yacong Zhang, Qinhuangdao (CN); Zhi Chen, Qinhuangdao (CN)

(73) Assignee: CITIC DICASTAL CO., LTD., Hebei (CN)

( * ) Notice: Subject to any disclaimer, the term of this patent is extended or adjusted under 35 U.S.C. 154(b) by 0 days.

(21) Appl. No.: 16/571,477

(22) Filed: Sep. 16, 2019

(65) Prior Publication Data

US 2020/0406372 A1 Dec. 31, 2020

(30) Foreign Application Priority Data

Jun. 27, 2019 (CN) .......................... 201910567224.3

(51) Int. Cl.
*B23B 35/00* (2006.01)
*B23B 39/16* (2006.01)
*B22D 25/02* (2006.01)

(52) U.S. Cl.
CPC .............. *B23B 35/00* (2013.01); *B23B 39/16* (2013.01); *B22D 25/02* (2013.01); *B23B 2222/04* (2013.01)

(58) Field of Classification Search
CPC ...... B23B 35/00; B23B 2222/04; B22D 25/02; B23P 15/00; B23P 23/02; B21J 5/027
See application file for complete search history.

(56) References Cited

U.S. PATENT DOCUMENTS

| | | | | |
|---|---|---|---|---|
| 5,471,724 A * | 12/1995 | Susnjara | ............... | B23B 39/167 29/53 |
| 6,375,394 B1 * | 4/2002 | Vesterlund | .............. | D21F 5/143 408/1 R |
| 2009/0116913 A1 * | 5/2009 | Xiao | ...................... | B23D 77/02 408/1 R |
| 2009/0245956 A1 * | 10/2009 | Apkarian | ............... | A61B 34/30 408/1 R |

FOREIGN PATENT DOCUMENTS

| | | | | |
|---|---|---|---|---|
| GB | 1009685 A | * | 11/1965 | ............. B23B 35/00 |
| JP | 05111813 A | * | 5/1993 | ........... C03B 33/027 |

* cited by examiner

*Primary Examiner* — Eric A. Gates
*Assistant Examiner* — Paul M Janeski
(74) *Attorney, Agent, or Firm* — Cooper Legal Group, LLC

(57) ABSTRACT

The present disclosure discloses a cutting method for an aluminum alloy casting, and a trimming die. The cutting method for the aluminum alloy casting includes the following steps of: drilling a part to be cut off of the aluminum alloy casting by multiple annular drills, and withdrawing the annular drills when the annular drills drill to a preset position; and separating multiple scraps to be separated from the aluminum alloy casting by the trimming die.

7 Claims, 4 Drawing Sheets

CUTTING METHOD FOR ALUMINUM ALLOY CASTING, AND TRIMMING DIE

CROSS-REFERENCE TO RELATED APPLICATION

The present application claims priority to Chinese Patent Application No. 201910567224.3, filed on Jun. 27, 2019, the contents of which are hereby incorporated by reference in their entirety.

BACKGROUND

At present, many aluminum alloy castings on automobile chassis, such as automobile caliper brackets and automobile steering knuckles, are produced by low-pressure or differential-pressure casting. Parts in the automobile industry are produced in large quantities, which have requirements on both stable quality and low enough cost.

Since the diameter of a center hole of the automobile caliper bracket or automobile steering knuckle is large, in order to ensure the casting quality, the center hole is generally formed by cutting instead of being pre-cast. In this way, a large part of remaining casting materials are processed into aluminum scraps which cannot be directly remelted in a furnace, and thus the material utilization rate is low, and the production cost is increased. Moreover, when the diameter of the center hole is large, it will spend a long time for direct cutting, which further increases the production cost.

SUMMARY

The present disclosure relates to the casting processing technology, in particular to a cutting method for an aluminum alloy casting, and a trimming die.

In view of above, the embodiments of the present disclosure expect to provide a cutting method for an aluminum alloy casting, and a trimming die, which can improve the material utilization rate, shorten the processing time, and reduce the production cost.

In order to achieve the above purpose, the technical solutions of the embodiments of the present disclosure are realized as follows.

The embodiments of the present disclosure provide a cutting method for an aluminum alloy casting, and the method includes:

drilling a part to be cut off of the aluminum alloy casting by multiple annular drills, and withdrawing the annular drills when the annular drills drill to a preset position; and separating multiple scraps to be separated from the aluminum alloy casting by a trimming die.

In the above solution, the drilling a part to be cut off of the aluminum alloy casting by multiple of annular drills may include:

fixing the aluminum alloy casting to a numerical control machine tool, installing the annular drills to multiple tool rests of the numerical control machine tool respectively, and starting the numerical control machine tool for drilling the part to be cut off.

In the above solution, the part to be cut off may include multiple holes to be processed of the aluminum alloy casting and a runner formed when the aluminum alloy casting is cast.

In the above solution, the drilling a part to be cut off of the aluminum alloy casting by multiple annular drills may include:

fixing the aluminum alloy casting to a numerical control machine tool, installing two annular drills on the tool rests of the numerical control machine tool, and starting the numerical control machine tool for drilling the holes to be processed and the runner by using the two annular drills respectively.

In the above solution, the withdrawing the annular drills when the annular drills drill to a preset position may include:

withdrawing the annular drills when the annular drills drill to a position 2-3 mm from drilling through.

In the above solution, the separating multiple scraps to be separated from the aluminum alloy casting by a trimming die may include:

enabling multiple scrap ejecting blocks on the trimming die to stretch into multiple drilled holes formed by drilling of the annular drills respectively, to press against the scraps to be separated in the drilled holes with a preset pressure, so as to eject the scraps to be separated out of the drilled holes.

In the above solution, the separating multiple scraps to be separated from the aluminum alloy casting by a trimming die further may include:

cutting off flash on an outer side of the aluminum alloy casting by a trimming blade of the trimming die.

In the above solution, the method may further include, before the separating scraps to be separated from the aluminum alloy casting by a trimming die:

removing drilling cuttings from the drilled holes.

The embodiments of the present disclosure further provide a trimming die which is applied to any one of the above cutting methods for the aluminum alloy casting. The trimming die includes a die frame, a trimming blade and multiple scrap ejecting blocks, herein the die frame is installed to a hydraulic press, the trimming blade is positioned below the die frame and the shape of the trimming blade is adapted to that of the aluminum alloy casting, and the scrap ejecting blocks are positioned on a side of the trimming blade and the shape thereof correspond to that of the scraps to be separated of the aluminum alloy casting.

In the above solution, the die frame may include an upper pushing plate, a lower pushing plate, a movable plate and a pressing block; the pressing block and the movable plate are fixed together, and multiple springs are arranged between the movable plate and the upper pushing plate; the trimming blade and the scrap ejecting blocks are fixed together by the lower pushing plate and the upper pushing plate; and when the upper pushing plate moves downwards, the trimming blade and the scrap ejecting blocks are driven to move downwards to compress the springs, and the elastic forces of the springs drive the movable plate to move downwards.

According to the cutting method for the aluminum alloy casting, and the trimming die in the embodiments of the present disclosure, the annular drill is adopted for performing drilling, the integrity of most of the scraps is maintained, and the scraps is separated by the trimming die such that the drilling process cannot be impeded by the scraps; in this way, the material utilization rate is improved, the processing time is shortened, and the production cost is reduced.

Other beneficial effects of the embodiments of the present disclosure will be further explained in the detailed description in conjunction with specific technical solutions.

BRIEF DESCRIPTION OF THE DRAWINGS

In order to explain the technical solutions in the embodiments of the present disclosure more clearly, the drawings needed in the description of the embodiments will be briefly explained below. It should be understood that the drawings described below are only a part of the drawings of the embodiments of the present disclosure, and other drawings can be obtained according to these drawings without creative labor for those skilled in the art.

DETAILED DESCRIPTION OF THE EMBODIMENTS

Figure 1:
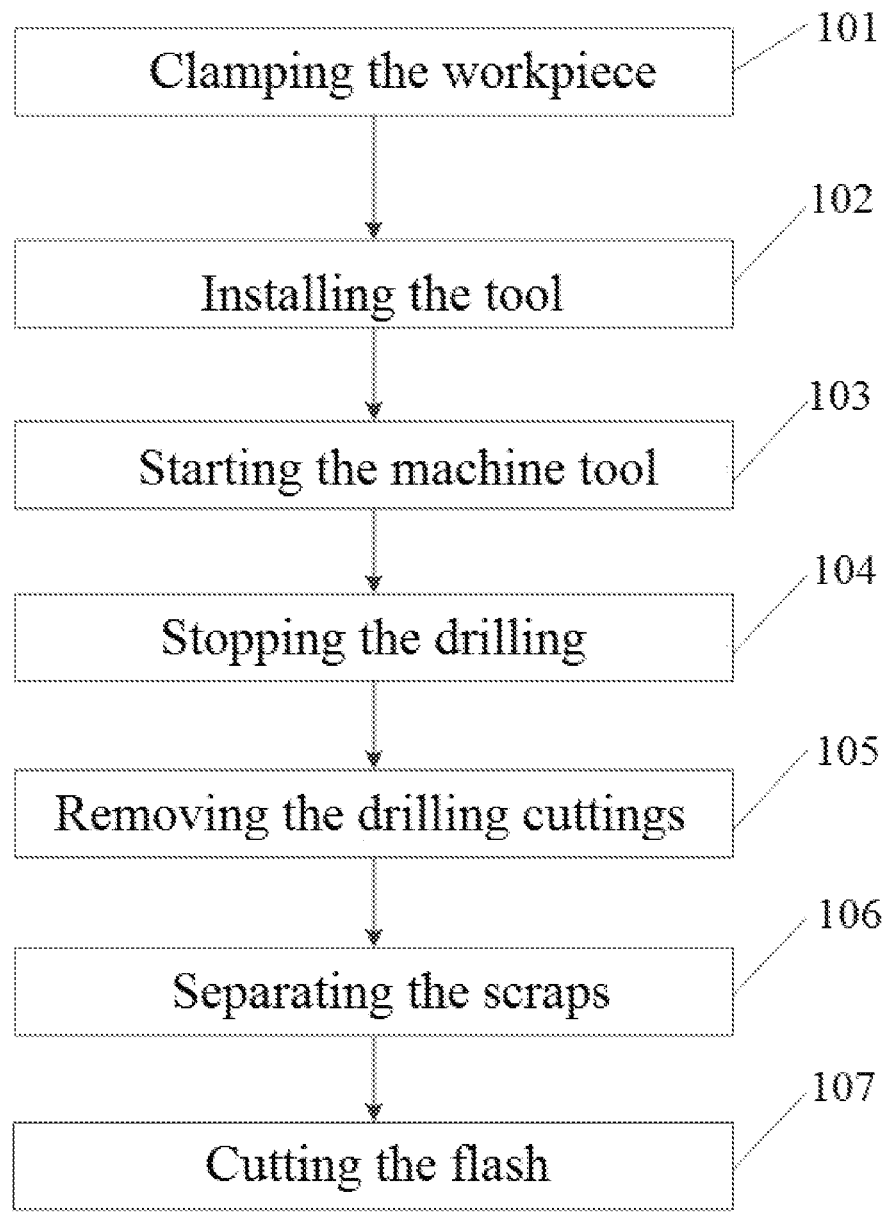
FIG. 1 is a flow chart of a cutting method for an aluminum alloy casting according to an embodiment of the present disclosure.

It should be noted that in the description of the embodiments of the present disclosure, unless otherwise specified and limited, term "connection" should be understood broadly, for example, it can be electrical connection or internal communication between two elements, it can be direct connection or indirect connection through a medium, and for an ordinary person skilled in the art, the specific meaning of the above term can be understood according to the specific situation. The terms "first", "second", or "third" in the embodiments of the present disclosure are only used to distinguish similar objects and do not represent a specific order of the objects. It is understood that the sequence of "first", "second", and "third" can be interchanged if allowed.

The embodiments of the present disclosure provide a cutting method for an aluminum alloy casting, and the method includes:

drilling a part to be cut off of the aluminum alloy casting by multiple annular drills, and withdrawing the annular drills when the annular drills drill to a preset position; and separating multiple scraps to be separated from the aluminum alloy casting by a trimming die.

According to the cutting method for the aluminum alloy casting in the embodiments of the present disclosure, the annular drill is adopted for performing drilling, the integrity of most of the scraps is maintained, and the scraps are separated by the trimming die in a manner that the drilling process cannot be impeded by the scraps; and thus, during the whole process, the material utilization rate is improved, the processing time is shortened, and the production cost is decreased.

In an embodiment, the drilling a part to be cut off of the aluminum alloy casting by multiple annular drills includes:

fixing the aluminum alloy casting to a numerical control machine tool, installing the annular drills to multiple tool rests of the numerical control machine tool respectively, and starting the numerical control machine tool for drilling the part to be cut off. In this way, the cutting depth is more controllable.

In an embodiment, the part to be cut off includes multiple holes to be processed of the aluminum alloy casting and a runner formed when the aluminum alloy casting is cast. Since the runner cannot be pre-cast during demolding of the aluminum alloy casting, the runner needs to be cut off. As the runner area is also large, the annular drill is adopted for saving materials.

In an embodiment, the drilling a part to be cut off of the aluminum alloy casting by multiple annular drills includes:

fixing the aluminum alloy casting to a numerical control machine tool, installing two annular drills on the tool rests of the numerical control machine tool, and starting the numerical control machine tool for drilling the holes to be processed and the runner by using the two annular drills respectively.

In an embodiment, the withdrawing the annular drills when the annular drills drill to a preset position includes:

withdrawing the annular drills when the annular drills drill to a position 2-3 mm from drilling through. In this way, a drill bit will not be stuck by the scraps after drilling through the part to be cut off, and the scraps can be easily ejected by the scrap ejecting blocks.

In an embodiment, the separating multiple scraps to be separated from the aluminum alloy casting by a trimming die includes:

enabling the scrap ejecting blocks on the trimming die to stretch into multiple drilled holes formed by drilling of the annular drills, to press against the scraps to be separated in the drilled holes with a preset pressure, so as to eject the scraps to be separated out of the drilled holes. The preset pressure herein is generally provided by a hydraulic press, by which the pressure provided is large and stable. The specific pressure needs to be adjusted according to the size of the scraps.

In an embodiment, the separating multiple scraps to be separated from the aluminum alloy casting by a trimming die further includes:

cutting off flash on an outer side of the aluminum alloy casting by a trimming blade of the trimming die. The flash of the aluminum alloy casting is generated in the casting process, and usually on a parting surface of a mold, which will affect assembly and needs to be cut off by the trimming die.

In an embodiment, the method further includes, before the separating scraps to be separated from the aluminum alloy casting by a trimming die:

removing drilling cuttings from the drilled holes. In this way, it can be avoided that the drilling cuttings affect the contact between the scrap ejecting blocks and the scraps when the scraps is separated.

The embodiments of the present disclosure provide a trimming die which is applied to the above cutting method for the aluminum alloy casting. The trimming die includes a die frame, a trimming blade and multiple scrap ejecting blocks, herein the die frame is installed to a hydraulic press, the trimming blade is positioned below the die frame and the shape of the trimming blade is adapted to that of the aluminum alloy casting, and the scrap ejecting blocks are positioned on a side of the trimming blade and the shape of the scrap ejecting blocks correspond to that of the scraps to be separated of the aluminum alloy casting. In this way, when the flash of the aluminum alloy casting is cut off by the trimming die, the scraps can be ejected by the scrap ejecting blocks, which improving the efficiency.

In an embodiment, the die frame includes an upper pushing plate, a lower pushing plate, a movable plate and a pressing block; the pressing block and the movable plate are fixed together, and multiple springs are arranged between the movable plate and the upper pushing plate; the trimming blade and the scrap ejecting blocks are fixed together by the lower pushing plate and the upper pushing plate; and when the upper pushing plate moves downwards, the trimming blade and the scrap ejecting blocks are driven to move downwards to compress the springs, and the elastic forces of the springs drive the movable plate to move downwards.

The present disclosure will be described in further detail below in conjunction with the accompanying drawings and specific embodiments. It should be understood that the specific embodiments described herein are only for the purpose of explaining the present disclosure and are not intended to limit the present disclosure; moreover, the embodiments described below are only a part of the embodiments of the present disclosure, not all of the embodiments. According to these embodiments, all other embodiments obtained without creative labor by an ordinary person skilled in the art fall within the scope of protection of the present disclosure.

First Embodiment

Figure 2:
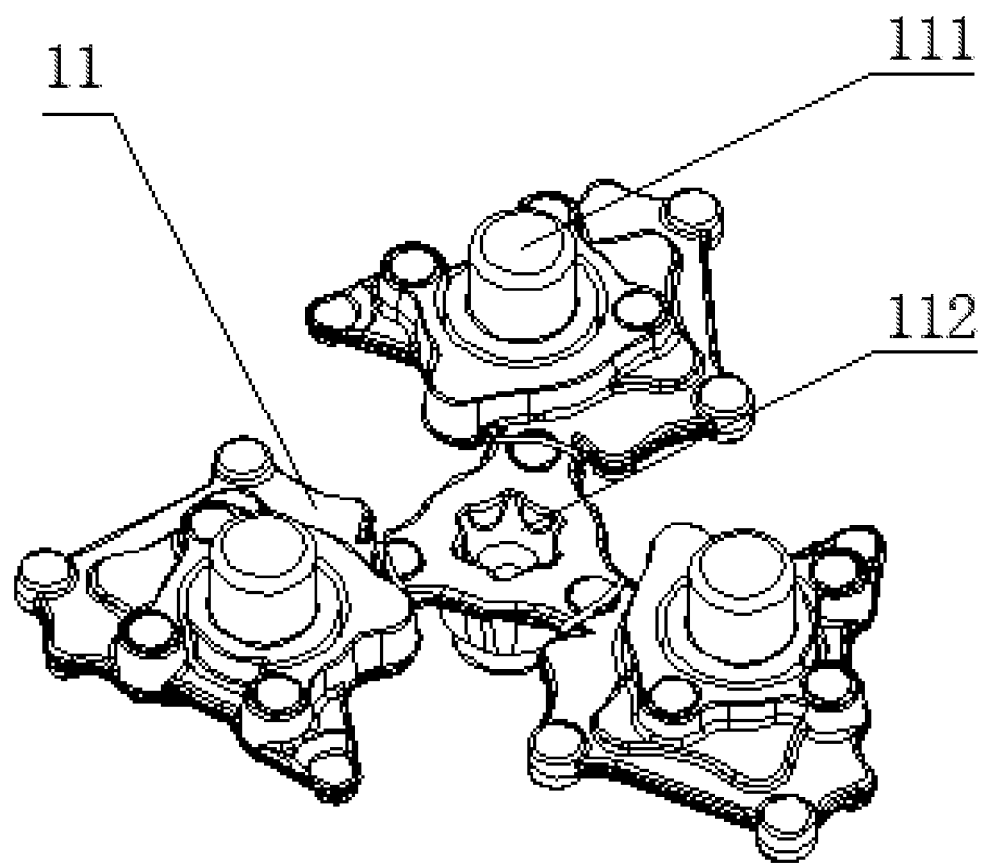
FIG. 2 is a schematic diagram of an aluminum alloy casting according to an embodiment of the present disclosure.

This embodiment provides a cutting method for an automobile caliper bracket casting, wherein the automobile caliper bracket is an aluminum alloy casting, and the specific shape thereof is shown in FIG. 2. It can be understood that the cutting method for the automobile caliper bracket casting in this embodiment is also applicable to other aluminum alloy castings.

Figure 3:
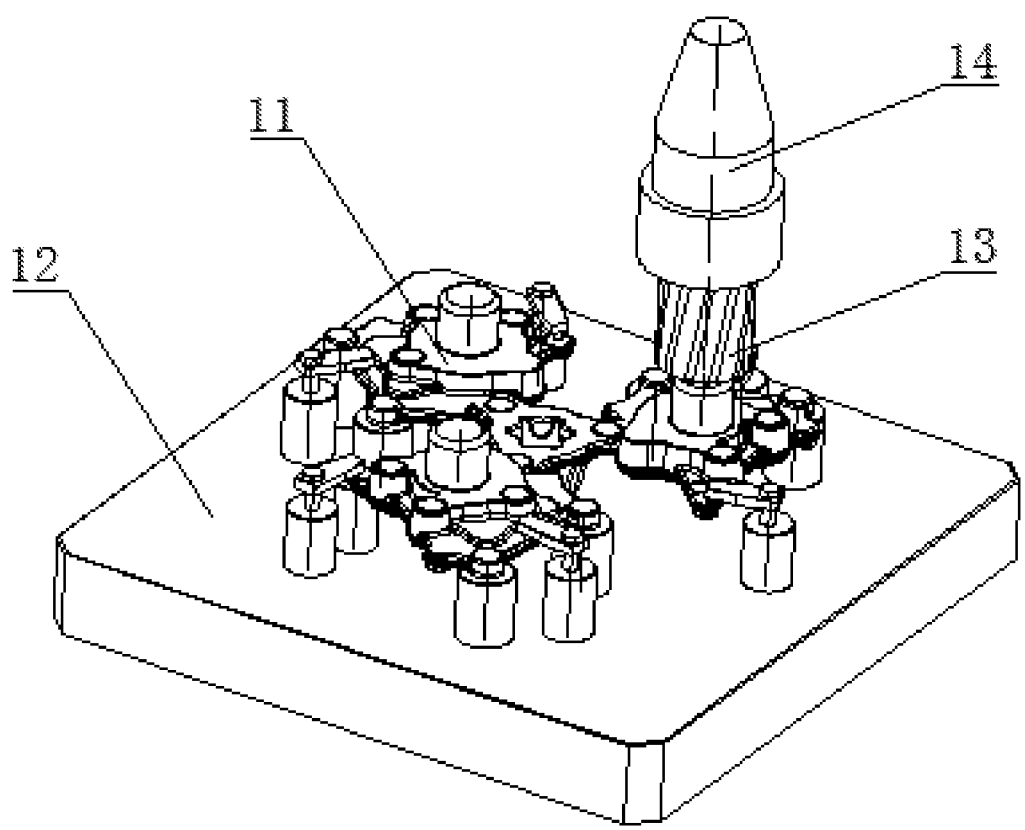
FIG. 3 is a schematic diagram of clamping an aluminum alloy casting according to an embodiment of the present disclosure.

As shown in FIG. 1, the method includes:

Step 101: clamping the workpiece: fixing the automobile caliper bracket casting 11 on a processing platform 12 of a numerical control machine tool, as shown in FIG. 3, herein the automobile caliper bracket casting 11 is shown in FIG. 2.

Step 102: installing the tool: installing two annular drills 13 (only one of which is shown in the figure) on multiple tool rests (not shown in the figure) of the numerical control machine tool respectively, herein each of the annular drills 13 is installed on a tool rest by a tool shank 14, as shown in FIG. 3.

Step 103: starting the machine tool to drill: starting the numerical control machine tool, and drilling the holes to be processed 111 and a runner 112 by using the two annular drills 13 respectively;

Step 104: stopping the drilling: withdrawing the annular drills 13 when the annular drills drill to a position 2-3 mm from drilling through.

Step 105: removing drilling cuttings: removing the drilling cuttings from drilled holes.

Step 106: separating the scraps: enabling multiple scrap ejecting blocks on the trimming die to stretch into the drilled holes formed by drilling of the annular drills 13, to press against the scraps to be separated in the drilled holes with a preset pressure, so as to eject the scraps to be separated out of the drilled holes, that is, to eject the scraps out by hydraulic pressure.

Step 107: cutting flash: cutting off the flash on the outer side of the automobile caliper bracket casting 11 by the trimming blade of the trimming die. The steps 107 and 106 are simultaneously conducted, but are taken as separate steps as the operations are different.

Second Embodiment

Figure 4:
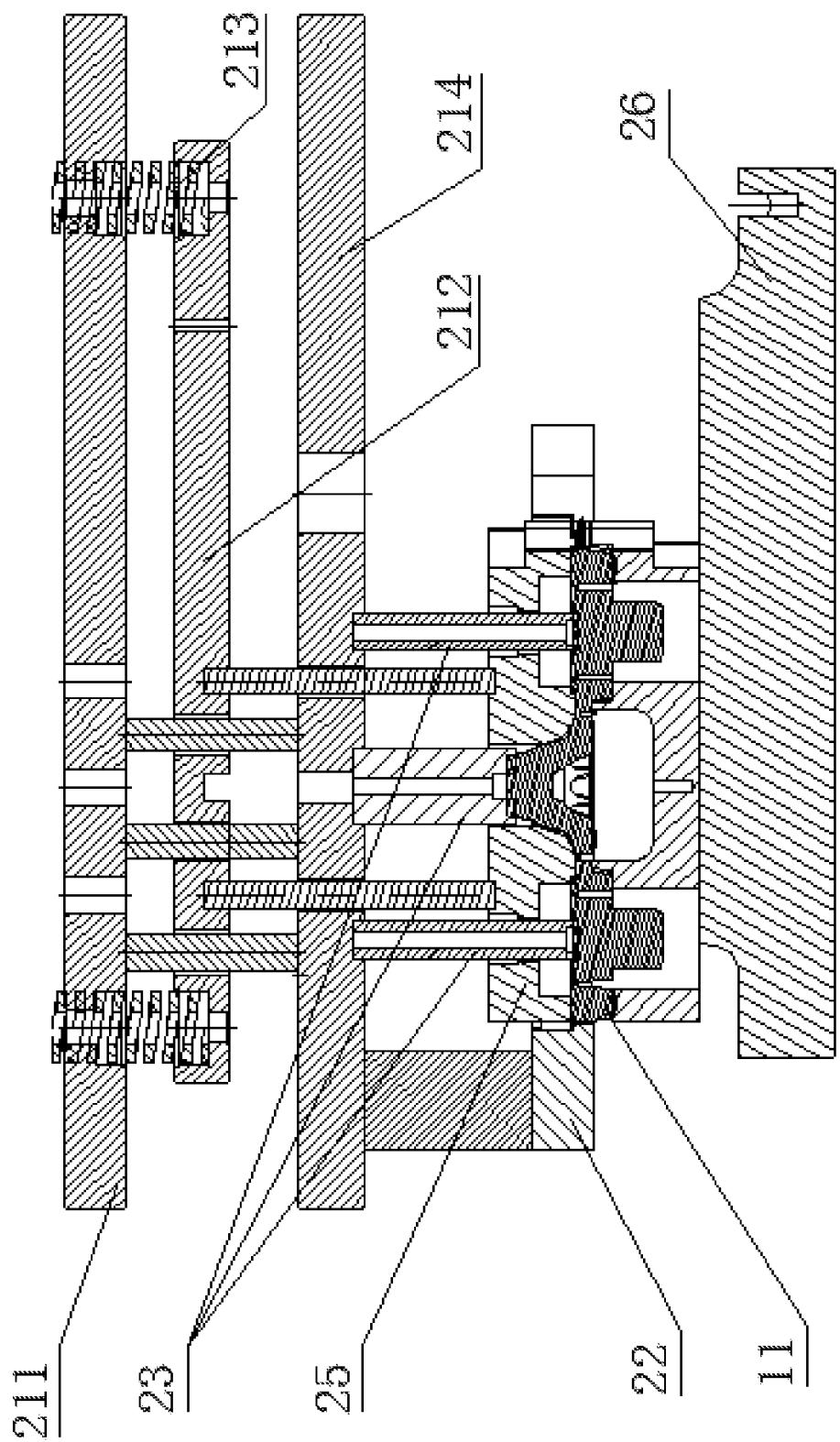
FIG. 4 is a schematic diagram of a trimming die according to an embodiment of the present disclosure.

This embodiment provides a trimming die which can be applied to the First Embodiment. As shown in FIG. 4, the trimming die includes a die frame, a trimming blade 22 and multiple scrap ejecting blocks 23, herein the die frame is installed to a hydraulic press, the trimming blade 22 is positioned below the die frame and the shape of the trimming blade is adapted to that of the automobile caliper bracket casting 11, and the scrap ejecting blocks 23 are positioned on one side of the trimming blade 22 and the shape of the scrap ejecting blocks correspond to that of the scraps to be separated of the automobile caliper bracket casting 11.

The trimming die further includes a pressing block 25 and a base 26, herein the pressing block 25 is used for pressing the automobile caliper bracket casting 11 during trimming, and the base 26 is used for supporting the automobile caliper bracket casting 11 and the trimming die.

When the hydraulic press drives the trimming blade 22 to move up and down along the die frame, the scrap ejecting blocks 23 are also driven to move up and down, such that when the trimming blade 22 cuts off the flash of the automobile caliper bracket casting 11, the scraps in center holes of the automobile caliper bracket casting 11 are also ejected, which improving the processing efficiency.

Specifically, the die frame includes an upper pushing plate 211, a movable plate 212 and the pressing block 25; the pressing block 25 and the movable plate 212 are fixed together, and multiple springs 213 are arranged between the movable plate 212 and the upper pushing plate 211; the trimming blade and the scrap ejecting blocks are fixed together by the lower pushing plate and the upper pushing plate; when the upper pushing plate moves downwards, the elastic forces of the springs 213 apply pressure on the movable plate and the pressing block continuously, and thus the pressing block presses the automobile caliper bracket casting 11 tightly; meanwhile, since the trimming blade 22 and the scrap ejecting blocks 23 are linked by the lower pushing plate 214 and the upper pushing plate 211, when the upper pushing plate 211 moves downwards, the trimming blade 22 and the scraps ejecting block 23 also move downwards, such that the flash can be cut off and the scraps can be ejected.

Here, the springs 213 are compression springs, and a sufficient compression stroke needs to be designed, so as to achieve the purposes of flash removal and scraps ejection.

Further, the trimming die of this embodiment also plays a role in cooperating with the process method for machining the center holes of the automobile caliper bracket casting 11 by the annular drills 13, which improving the material utilization rate, decreasing the processing time and the production cost when processing the automobile caliper bracket casting 11.

The above embodiments are only preferred embodiments of the present disclosure and not intended to limit the protection scope of the present disclosure. Any modification, equivalent substitution and improvement made within the spirit and principles of the present disclosure shall fall into the protection scope of the present disclosure.

The invention claimed is:

1. A cutting method for an aluminum alloy casting, the method comprising:
   fixing the aluminum alloy casting to a numerical control machine tool,
   installing a plurality of annular drills to a plurality of tool rests of the numerical control machine tool respectively,
   starting the numerical control machine tool, and
   drilling a part to be cut off of the aluminum alloy casting by the plurality of annular drills, and withdrawing the plurality of annular drills when the plurality of annular drills drill to a preset position.

2. The cutting method for the aluminum alloy casting according to claim 1, wherein the part to be cut off comprises a plurality of holes to be processed of the aluminum alloy casting and a runner formed when the aluminum alloy casting is cast.

3. The cutting method for the aluminum alloy casting according to claim 2,
wherein the plurality of annular drills includes two annular drills, and the two annular drills are used for drilling the plurality of holes to be processed and the runner respectively.

4. The cutting method for the aluminum alloy casting according to claim 1, wherein withdrawing the plurality of annular drills when the plurality of annular drills drill to the preset position comprises:
withdrawing the plurality of annular drills when the plurality of annular drills drill to a position 2-3 mm from drilling through the aluminum alloy casting.

5. The cutting method for the aluminum alloy casting according to claim 1, wherein the method further comprises:
stretching a plurality of scrap ejecting blocks on a trimming die into a plurality of drilled holes formed by drilling of the plurality of annular drills respectively, to press against a plurality of scraps to be separated in the plurality of drilled holes with a preset pressure, and ejecting the plurality of scraps to be separated out of the plurality of drilled holes, so as to separate the plurality of scraps to be separated from the aluminum alloy casting by the trimming die.

6. The cutting method for the aluminum alloy casting according to claim 5, wherein the method further comprises, before stretching the plurality of scrap ejecting blocks on the trimming die into the plurality of drilled holes:
removing drilling cuttings from the plurality of drilled holes.

7. The cutting method for the aluminum alloy casting according to claim 1, wherein the method further comprises:
cutting off flash on an outer side of the aluminum alloy casting by a trimming blade of a trimming die, so as to separate a plurality of scraps to be separated from the aluminum alloy casting by the trimming die.

* * * * *